United States Patent
Yang et al.

(10) Patent No.: US 10,270,859 B2
(45) Date of Patent: Apr. 23, 2019

(54) SYSTEMS AND METHODS FOR SYSTEM-WIDE DIGITAL PROCESS BUS FAULT RECORDING

(71) Applicant: Schweitzer Engineering Laboratories, Inc., Pullman, WA (US)

(72) Inventors: Qiaoyin Yang, Pullman, WA (US); Normann Fischer, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 438 days.

(21) Appl. No.: 15/295,839

(22) Filed: Oct. 17, 2016

(65) Prior Publication Data
US 2018/0109114 A1    Apr. 19, 2018

(51) Int. Cl.
| H02H 7/00 | (2006.01) |
| H04L 29/08 | (2006.01) |
| G01D 9/00 | (2006.01) |
| H02H 1/00 | (2006.01) |
| H02J 13/00 | (2006.01) |

(52) U.S. Cl.
CPC .............. *H04L 67/12* (2013.01); *G01D 9/00* (2013.01); *H02H 1/0053* (2013.01); *H02J 13/0006* (2013.01); *Y02E 60/724* (2013.01); *Y02E 60/74* (2013.01); *Y04S 10/18* (2013.01); *Y04S 10/30* (2013.01)

(58) Field of Classification Search
None
See application file for complete search history.

(56) References Cited

U.S. PATENT DOCUMENTS

| 6,176,312 B1 | 1/2001 | Tubel |
| 7,281,112 B1 | 10/2007 | Loss |
| 7,565,220 B2 | 7/2009 | Huang |
| 8,024,494 B2 | 9/2011 | Soeda |
| 9,581,976 B2 | 2/2017 | Schweitzer |
| 2002/0046246 A1 | 4/2002 | Wright |
| 2007/0088973 A1 | 4/2007 | Passerini |
| 2009/0012728 A1 | 1/2009 | Spanier |

(Continued)

OTHER PUBLICATIONS

Costello, David, Understanding and Analyzing Event Report Information, 27th Annual Western Protective Relay Conference, Oct. 2000.

(Continued)

*Primary Examiner* — Stephen W Jackson
(74) *Attorney, Agent, or Firm* — Justin K. Flanagan

(57) ABSTRACT

The present disclosure provides systems and methods for generating a system-wide event report for electrical power delivery systems. A monitoring device within the power system may generate a key message upon the occurrence of a predetermined condition. A master IED within the power system may generate and/or transmit a system-wide key message to a plurality of monitoring IEDs within the power system. Digital process bus data, continuously recorded by a plurality of monitoring IEDs within the power system, may be saved locally by each monitoring IED within the power system and retrieved by a master IED within the power system. Alternatively, digital process bus data may be transmitted to a master IED and saved locally. A software and/or hardware module may be used to merge the local reports into a system-wide event report.

24 Claims, 10 Drawing Sheets

(56) References Cited

U.S. PATENT DOCUMENTS

| | | |
|---|---|---|
| 2009/0140060 A1 | 6/2009 | Stoner |
| 2009/0296583 A1 | 12/2009 | Dolezilek |
| 2010/0131109 A1 | 5/2010 | Rasmussen |
| 2010/0286937 A1 | 11/2010 | Hedley |
| 2011/0012603 A1 | 1/2011 | Bose |
| 2011/0303311 A1 | 12/2011 | Klicpera |
| 2012/0266209 A1* | 10/2012 | Gooding ............... H04L 63/20 726/1 |
| 2014/0122800 A1 | 5/2014 | Williams |
| 2014/0128999 A1 | 5/2014 | Schweitzer |
| 2017/0366342 A1* | 12/2017 | Gehrmann ............ H04W 4/70 |

OTHER PUBLICATIONS

Perez, Joe: A Guide to Digital Fault Recording Event Analysis, IEEE, 2010.

Strang, William; et al, Considerations for Use of Disturbance Recorders; a Report to the System Protection Subcommittee of the Power System Relaying Committee of the IEEE Power Engineering Society, Dec. 27, 2006.

Costello, David, Event Analysis Tutorial, Part 1: Problem Statements, Jan. 13, 2012.

Kontron, PCM-PC Condition Monitoring for industrial PCs, Jan. 2007.

PCT/US13/67224 Patent Cooperation Treaty, International Search Report and Written Opinion of the International Searching Authority, May 7, 2014.

\* cited by examiner

SYSTEMS AND METHODS FOR SYSTEM-WIDE DIGITAL PROCESS BUS FAULT RECORDING

TECHNICAL FIELD

This disclosure relates to a system and methods for report generation and data storage in electrical power delivery systems. More particularly, this disclosure relates to systems and methods for capturing system-wide transient data and generating a system-wide event report.

BRIEF DESCRIPTION OF THE DRAWINGS

Non-limiting and non-exhaustive embodiments of the disclosure are described herein, including various embodiments of the disclosure with reference to the figures listed below.

Figure 1A:
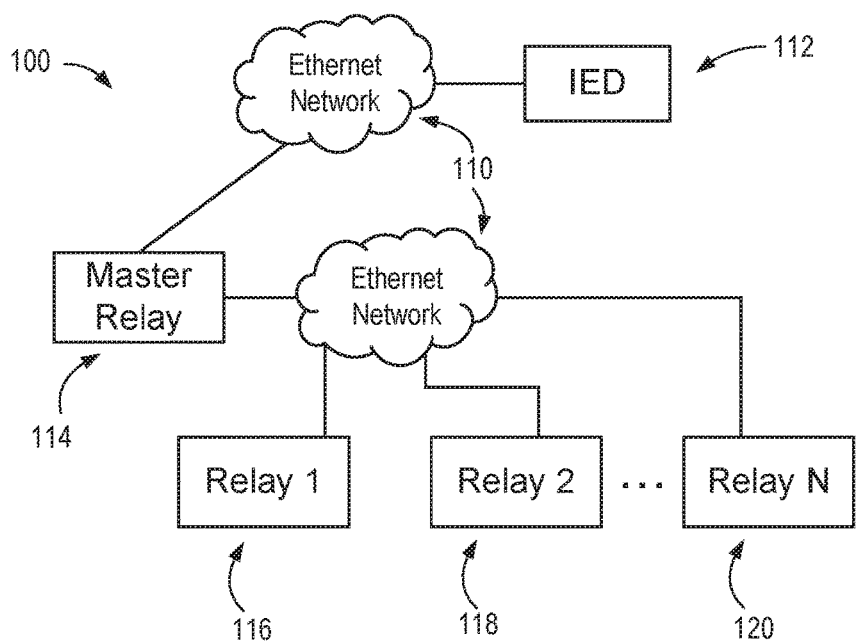
FIG. 1A illustrates a station-wide recording system, according to one embodiment.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Power systems and/or utility engineers may utilize transient data recorded during a fault within a power system for various purposes, including diagnostics, repairs, preventative measures, and other uses. Fault records can be used to investigate anomalies, irregularities, and/or inefficiencies, among other things. Engineers and analysts (whether human on computer-based) may utilize fault records within a power system to improve system performance and/or reliability. In power supply systems, a fault within the system can cause a report to be generated by a device on the line that experienced the fault. Subsequent transient data on the line is recorded on an intelligent electronic device (IED) and then formatted into an event report. For example, power system data may be formatted, transmitted, analyzed, and/or otherwise manipulated in the common format for transient data exchange (COMTRADE) file format.

In various embodiments, an IED may be used to monitor, protect, and/or control a portion of a power distribution system. In response to a detected event, the IED may collect, record, and/or transmit transient data relative to the portion of the power distribution system associated with the IED. Other IEDs within the power distribution system associated with other portions of the power distribution system may not collect, record, or transmit transient data because the detected event is not associated therewith.

While collecting transient data on a single line and generating a report may be useful, single line reporting does not offer power systems and utility engineers the ability to interpret the effects of an event (e.g., a fault) on the entire power delivery system.

This disclosure provides methods and systems to generate a system-wide event report detailing fault data related to transient power system disturbances of a plurality of subsystems or even an entire electrical power delivery system. A system-wide event report may be triggered by an operator and/or a set of predetermined operating conditions or events. A system-wide event report may include transient data from two or more subsystems of an electrical power delivery system. In some embodiments, a system-wide event report may include transient data from all subsystems and/or IEDs of an electrical power delivery system within a local area network. In still other embodiments, a system-wide event report may include transient data from all subsystems and/or IEDs of an electrical power delivery system within a wide area network.

More specifically, a master IED (e.g., special purpose device, Ethernet switch, process bus publishing IED, digital protection relay, or the like) configured to generate a system-wide event report may communicate with a plurality of monitoring IEDs (e.g., special purpose devices, Ethernet switches, process bus publishing IEDs, digital protection relays, or the like) on each respective line of a substation. The plurality of monitoring IEDs associated with each line or subsection of the substation may be configured to transmit a key message upon the occurrence of a predetermined triggering condition (e.g., a fault on a line) or by an operator. A plurality of monitoring IEDs within the power system may be configured to continuously record digital process bus data. Available memory limitations may result in recorded data normally being erased or written over after a period of time.

In various embodiments, a monitoring IED may transmit a key message in response to the occurrence of a predetermined condition (i.e., an event) to a master IED or one or more other monitoring IEDs within the power system (e.g., received by a relay or Ethernet switch in a different substation).

Upon the occurrence of a predetermined condition, a monitoring IED that detects the predetermined condition may transmit a key message via a local or wide area communication network. The key messages may include a defined list of generic object oriented substation events (GOOSE) messages or a related transfer mechanism. GOOSE controlled module mechanisms are associated with the IEC 61850 communication standard and provide a mechanism for transferring fault (or other event) data over substation networks without installing vender-specific hardware. Non-limiting examples of conditions that may trigger a key message to transmit are the occurrence of a fault within the power system and/or a control from an operator.

In some embodiments, the receiving IEDs may continually or periodically record data. The amount and/or type of data stored may be dependent on the IED's processing capability, memory available, bandwidth for transmitting and/or receiving data, etc. In some embodiments, the amount and/or type of data continuously recorded may be relatively small due to processing, networking, and/or storage limitations. Data continuously or periodically recorded may be referred to as pre-trigger recordings.

Alternatively or additionally, the master IED(s) may send key messages to trigger the receiving IEDs to record for a period of time. The trigger may increase the amount of data stored, the type of data stored, and/or the duration for which the recorded data will be maintained without being discarded or written-over. Data recorded in response to a trigger may be referred to as post-trigger recordings. The combination of pre-trigger and post-trigger recording may then be transmitted as a single event report or a single snapshot for the power system.

As a specific example, the receiving IEDs may continuously record/buffer a small amount of data (e.g., two seconds of pre-trigger data) and once the trigger/key messages is received, the IED may start post-trigger recording. The pre-fault data combined with the data after the detection of fault or the receipt of key messages may then be transmitted to remote control center.

In some embodiments, a monitoring IED detecting a predetermined condition may transmit a key message via a local or wide area network with other monitoring IEDs. IEDs receiving the key message may record transient data in a permanent manner or a semi-permanent manner, and/or transmit the recorded data to a central location. In some embodiments, the receiving IEDs may store or transmit data from a defined time period prior to receiving the key message. In some embodiments, the key message may include instructions for the receiving IEDs identifying a time period before the reception of the key message for which the receiving IEDs should store and/or transmit recorded data. Similarly, the key message may include instructions for the receiving IEDs identifying a time period after the reception of the key message for which the receiving IEDs should store and/or transmit recorded data.

In another embodiment, a monitoring IED detecting a predetermined condition may transmit a key message to a master IED. Alternatively, the monitoring IED may provide an indication of the detected event to the master IED and the master IED may generate a key message. In another embodiment, other monitoring IEDs within the power system may receive the key message (e.g., an IED on a different line within the substation or an IED in a different substation). IEDs within the power system may be connected to a local area network or wide area network to facilitate key message communication.

The IED receiving a key message may be configured to respond by transmitting a system-wide key message to all IEDs within the power system. In another embodiment, a master IED may transmit a system-wide key message to only IEDs within a certain substation of the power system. A plurality of IEDs within the power system may receive the system-wide key message.

IEDs that receive a system-wide key message, whether from a master IED or directly from an event-detecting IED, may be configured to generate and save local event reports (e.g., COMTRADE reports) from continuously recorded digital process bus data.

A master IED or another IED within the power system may retrieve the local reports. The local reports generated by IEDs within the power system may be retrieved using conventional methods such as File Transfer Protocol (FTP) or IEC 61850 Manufacturing Message Specification (MMS) file transfer services. Alternatively, the local COMTRADE reports generated by IEDs within the system may be retrieved using a software module. In alternative embodiments, hardware and firmware may be utilized instead of software. For example, application specific control circuitry may be utilized to increase speed, efficiency, serviceability, and/or reduce maintenance costs.

In some embodiments, an IED within the power system (e.g., the master IED) may align the time domain of the local reports after the data is collected. Alternatively, the time domain may already be synchronized when the data is collected through the use of a time synchronization protocol to synchronize the monitoring IEDs within the power system, such as a precision time protocol (PTP).

The local reports may be merged by the master IED or another IED within the power system to form a system-wide event report (e.g., a system-wide COMTRADE report). Alternatively, a software module may be used to merge the local reports. In alternative embodiments, hardware and firmware may be utilized instead of software. For example, application specific control circuitry may be utilized to increase speed, efficiency, serviceability, and/or reduce maintenance costs.

The master IED or another IED within the power system may generate a network traffic capture file and a system-wide event report. Alternatively, a software module may be used to generate a network traffic capture file and a system-wide event report. In alternative embodiments, hardware and firmware may be utilized instead of software. For example, application specific control circuitry may be utilized to increase speed, efficiency, serviceability, and/or reduce maintenance costs.

The phrase "system-wide report" is used to differentiate a report from "a single line report." A single line report may include data from one or more sensors, breakers, monitoring devices, IEDs, etc. that are on a transmission or distribution line that experiences a fault event. In contrast, a system-wide report will include data from the one or more sensors, breakers, monitoring devices, IEDs, etc. that are on a transmission or distribution line that experiences a fault event and data from at least one other device on at least one other transmission or distribution line that is part of the local or wide area system that did not experience a fault event. System-wide does not necessarily, but may, include data from each transmission or distribution line within a system. Rather, the system-wide report may include data from two or more transmission or distribution lines—one that experienced the fault event and at least one of a plurality that did not experience the fault event.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term "IED" may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term "IED" may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, PAL, PLA, PLD, CPLD, Field Programmable Gate Array (FPGA), or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc. that performs one or more tasks or implement particular abstract data types.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. In alternative embodiments, hardware and firmware may be utilized instead of software. For example, application specific control circuitry may be utilized to increase speed, efficiency, serviceability, and/or reduce maintenance costs.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1A illustrates a network diagram of a simplified substation configured to generate a station-wide event report, according to some embodiments. A power delivery system may include an operably connected substation 100. The substation 100 may include an IED 112, master relay 114, a first relay 116, and a second relay 118. The substation 100 may include relay N 120, where N represents any number of relays within the power delivery system, including potentially relays in parallel, redundant relays, relays in series, and/or relays associated with different components or even different component types. Any or all of the components within substation 100 may be operably connected to one or more other components within the power delivery system (e.g., via an Ethernet Network 110).

Figure 1B:
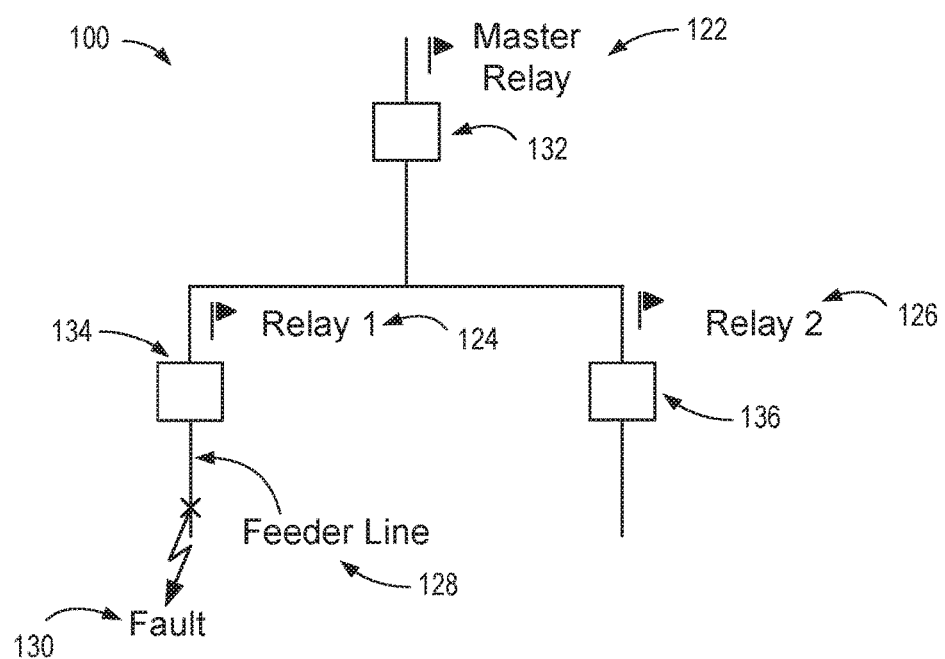
FIG. 1B illustrates a station-wide recording system, according to another embodiment.

FIG. 1B illustrates an example of a line diagram similar to the network diagram shown in FIG. 1A and configured to generate a station-wide event report, according to one embodiment. The substation 100 may include a master relay 122, a first relay 124, and a second relay 126. Additionally, each relay within the substation may be operably connected to a corresponding breaker 132, 134, 136. Each component within substation 100 may be operably connected to another component within the power delivery system. When a feeder line 128 within the substation 100 experiences a predetermined electrical event (i.e., a fault 130), the first relay 124 may communicate the occurrence to the master relay 122. The master relay 122 may generate and transmit a key message (e.g., GOOSE message) to an IED (not shown) within the substation 100. The IED may transmit a system-wide key message to the first relay 124 and the second relay 126 which may be configured to continuously record digital process bus data. Upon receiving the key message, the first relay 124 and the second relay 126 may generate a local event report from the continuously recorded digital process bus data. The IED within the substation 100 may retrieve the local event reports and merge them into (or to create) a station-wide event report.

Figure 2A:
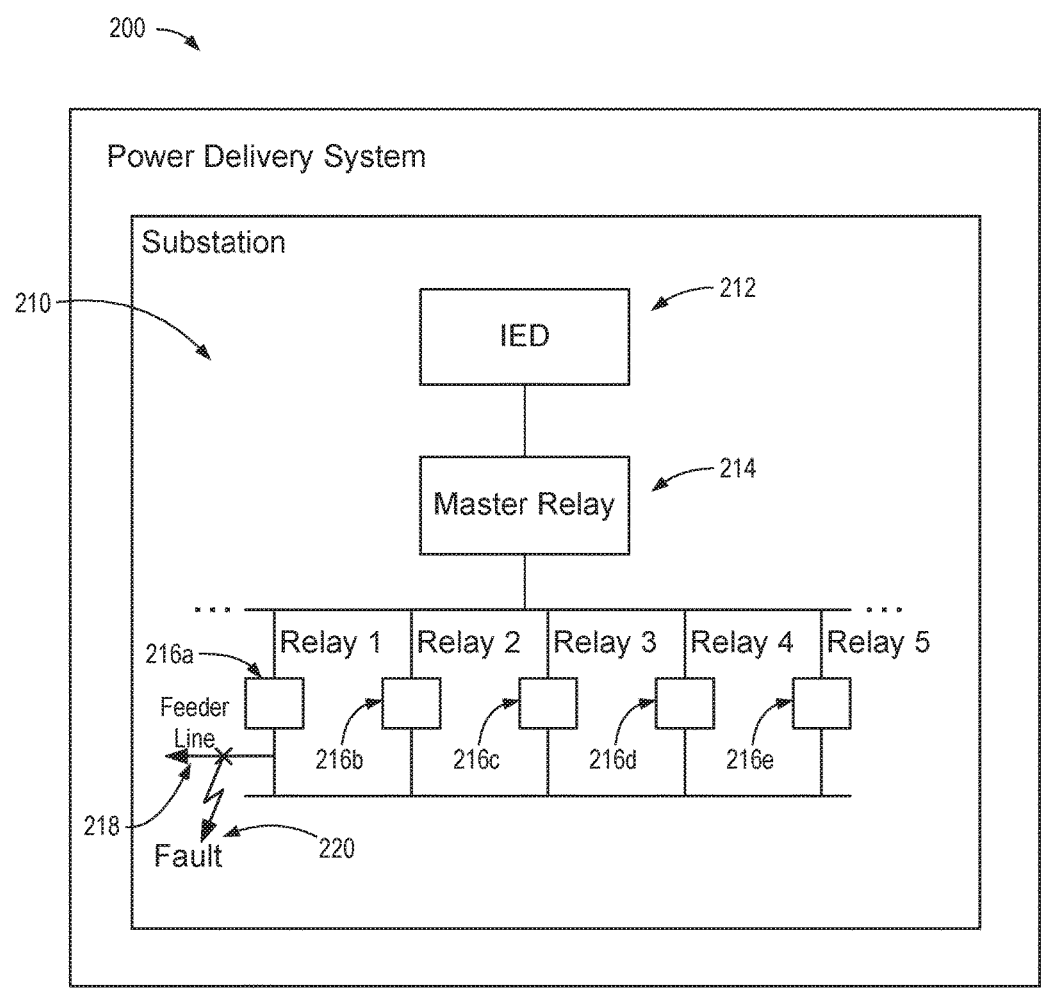
FIG. 2A illustrates a station-wide recording system, according to yet another embodiment.

FIG. 2A illustrates an example of another embodiment of a substation configured to generate a station-wide event report. A power delivery system 200 may include an operably connected substation 210. The substation 210 may include an IED 212, a master relay 214, a plurality of relays 216(*a-e*), and a feeder line 218. Each component within the substation 210 may be operably (e.g., communicatively)

connected to another component within the substation. When feeder line 218 of the substation 210 within the power delivery system 200 experiences a predetermined electrical event (i.e., a fault 220), a first relay 216a may communicate the occurrence to the master relay 214. The master relay 214 may generate and transmit a key message (e.g., GOOSE message) to the IED 212 within the substation 210. The IED 212 may transmit a system-wide key message to the first relay 216a and a plurality of relays 216(b-e) which may be configured to continuously record digital process bus data. Upon receiving the key message, the plurality of relays 216(a-e) may generate local event reports from continuously recorded digital process bus data. The IED 212 within the substation 210 may retrieve the local event reports from the plurality of relays 216(a-e) and merge them into a station-wide event report.

Figure 2B:
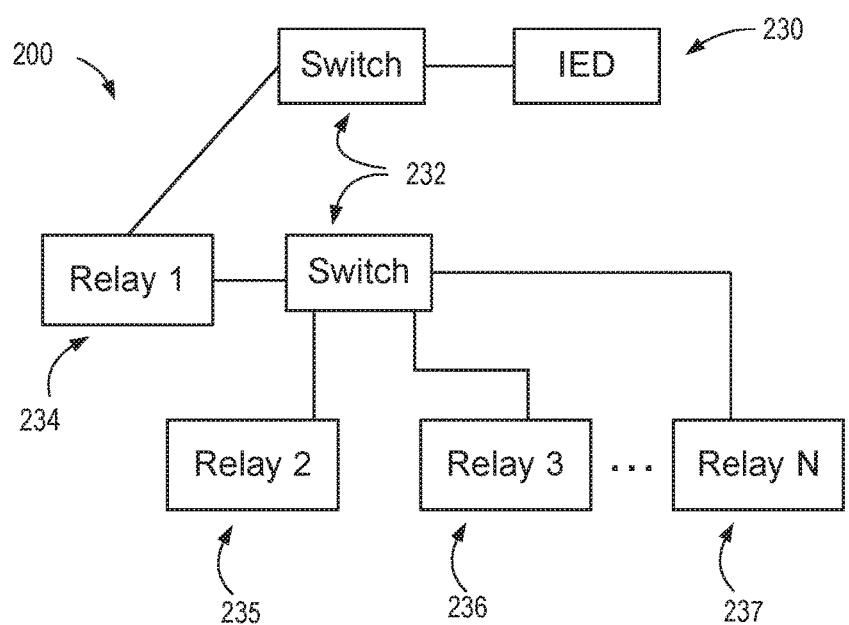
FIG. 2B illustrates a station-wide recording system, according to one embodiment.

FIG. 2B illustrates a network diagram of a substation configured to generate a station-wide event report, according to one embodiment. A simplified power delivery system (not shown) may include an operably connected substation 200. The substation 200 may include an IED 230, a first relay 234, a second relay 235, and a third relay 236. The substation 100 may include relay N 237, where N represents any number of relays within the power delivery system. Each component within substation 100 may be operably connected to another component within the power delivery system (e.g., a plurality of switches 232).

Figure 2C:
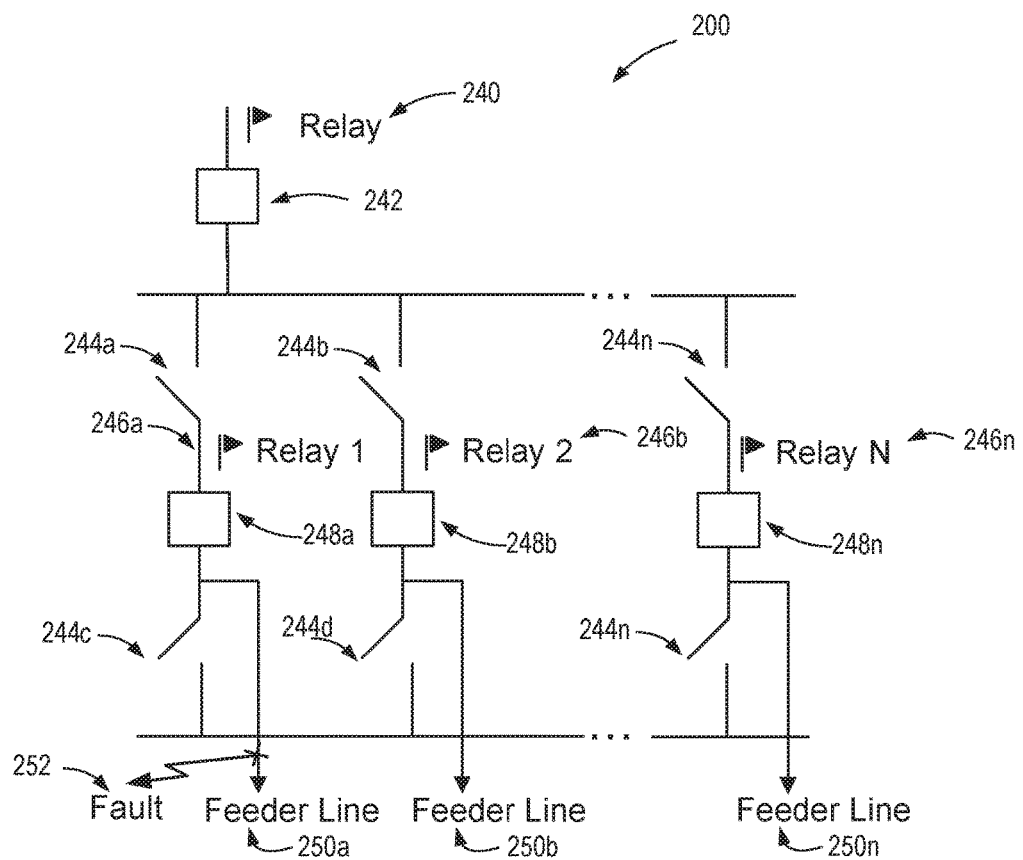
FIG. 2C illustrates a station-wide recording system, according to another embodiment.

FIG. 2C illustrates an example of a line diagram based on the network diagram shown in FIG. 2B and configured to generate a station-wide event report, according to one embodiment. A power delivery system (not shown) may include an operably connected substation 200. The substation 200 may include a first relay 240, a plurality of relays on each line of the substation 246(a-n), and feeder lines 250(a-n). Each relay within the substation may be operably connected to a corresponding breaker 248(a-n). Each component within the substation 200 may be operably connected to another component within the substation. When feeder line 250a of the substation 200 within the power delivery system experiences a predetermined electrical event (i.e., a fault 252), a first relay 246a may communicate the occurrence to the relay 240. The relay 240 may generate and transmit a key message (e.g., GOOSE message) to an IED (not shown) within the substation. The IED may transmit a system-wide key message to the first relay 246a and a plurality of relays 246(b-n) which may be configured to continuously record digital process bus data. Upon receiving the key message, the plurality of relays 246(a-n) may generate local event reports from continuously recorded digital process bus data. The IED within the substation 200 may retrieve the local event reports from the plurality of relays 246(a-n) and merge them into a station-wide event report.

Figure 3:
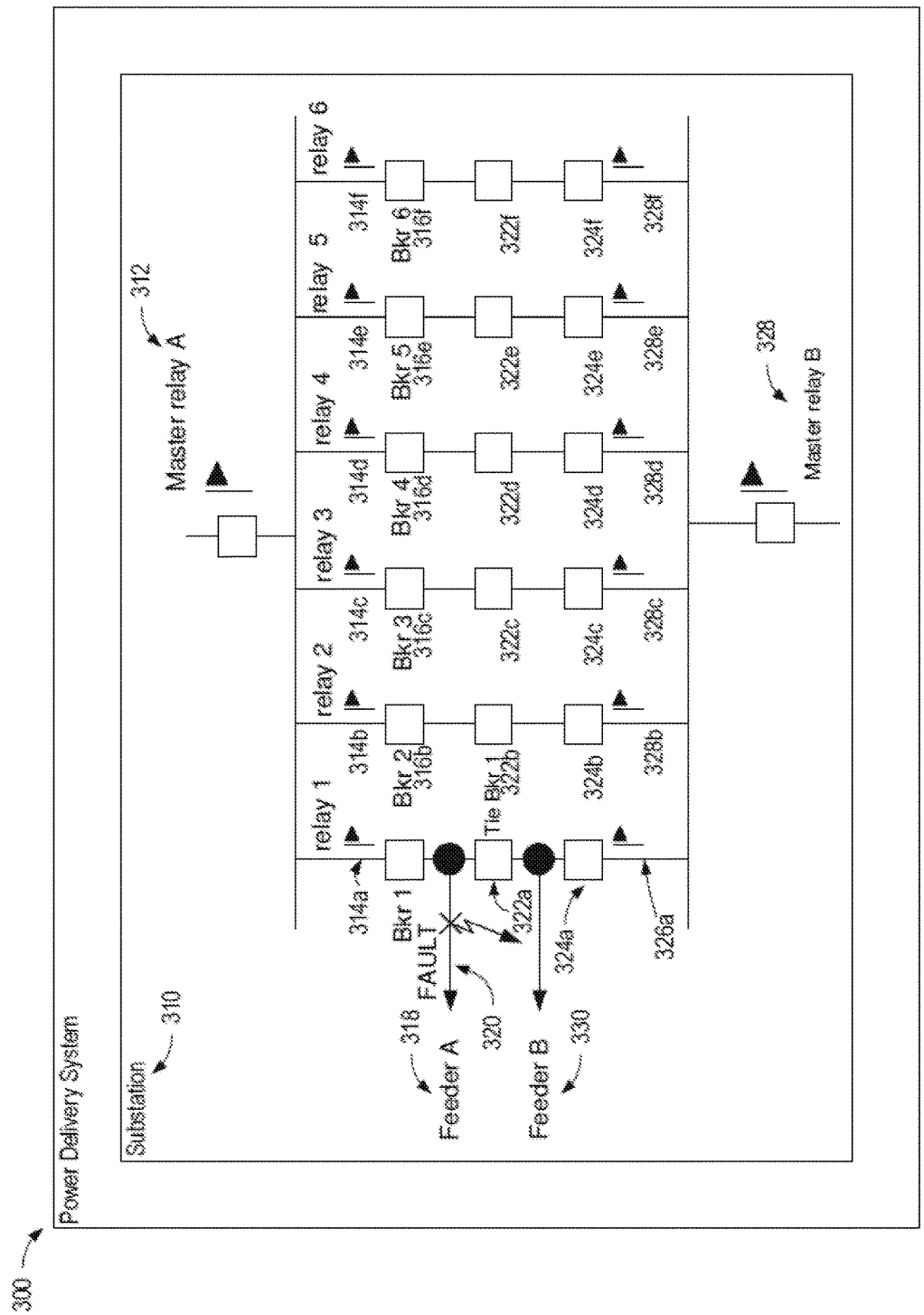
FIG. 3 illustrates a station-wide recording system, according to yet another embodiment.

FIG. 3 illustrates an example of another embodiment of a substation with the ability to generate a station-wide event report. A relay 314a may generate and transmit a key message as the result of a fault 320 detected on a feeder line 318. As the fault 320 occurred within the line(s) associated with relay 314a, the plurality of remaining relays 314(b-f) may not generate or transmit a key message. A master relay A 312 receives the key message generated and transmitted by the relay 314a. The master relay A 312 may transmit a station-wide key message to the plurality of relays 314(a-f) as a result of receiving a key message from the relay 314a. It should be appreciated that, in other embodiments, the master relay A 312 may not be necessary and any one of the plurality of relays 314(a-f) or breakers 316(a-f) within the power delivery system 300 could be used to communicate a station-wide key message to the remaining plurality of relays 314(a-f). It should be further appreciated that the present disclosure may also be utilized on a feeder line 330, such that a detected fault on the feeder line 330 may cause the plurality of relays 326(a-f) or breakers 324(a-f) to trigger the transmission of a key message to a master relay B 328.

In some embodiments, only some of the lines may receive or respond to a key message to generate the system-wide report. For example, a fault on a transmission line may result in a key message being sent to only neighboring transmission lines or a specific subset of transmission lines, rather than to all other transmission lines within a system. The report may still be referred to as a system-wide report even if it only includes data from one or more of the plurality of lines in addition to the lines that experienced the fault event.

Figure 4:
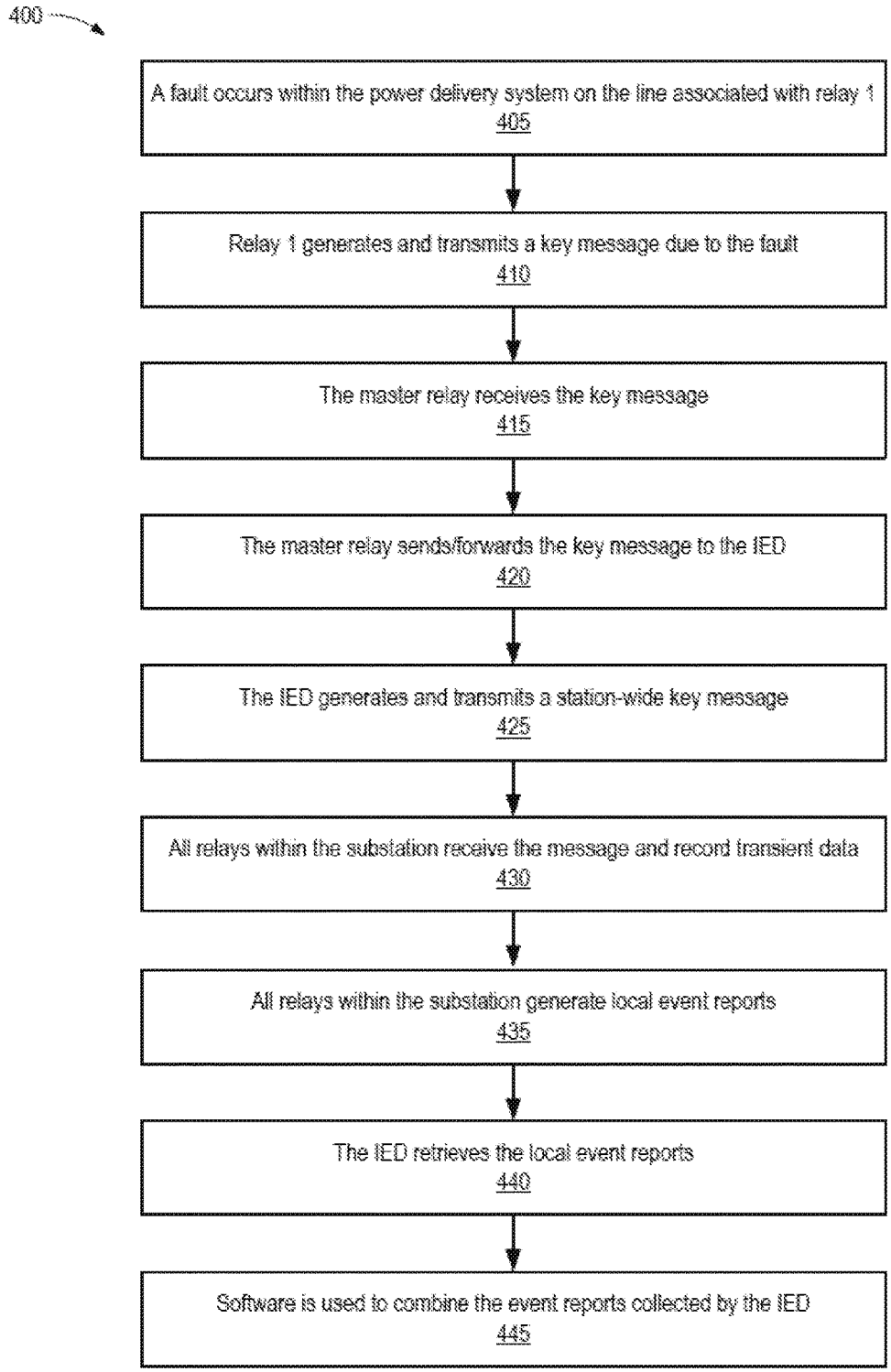
FIG. 4 is a flow chart of a method for generating of a station-wide event report, according to one embodiment.

FIG. 4 is a flow chart of a method 400 for generating a station-wide event report within an electrical power delivery system, according to one embodiment of the present disclosure. The method 400 may include detecting 405 the occurrence of a fault, control from an operator, or any other predetermined condition on a given line within the electrical power delivery system.

The method 400 may further include generating and transmitting 410 a key message (e.g., GOOSE message) upon the occurrence of the predetermined condition via a monitoring IED (e.g., special purpose device, Ethernet switch, process bus publishing IED, digital protection relay, or the like) within the electrical power delivery system.

The method 400 may also include receiving 415 a key message using a master relay and then sending/forwarding 420 the key message from a master relay.

The method 400 may include generating and transmitting 425 a station-wide key message (e.g., GOOSE message) upon receiving a forwarded key message using a master IED (e.g., special purpose device, Ethernet switch, process bus publishing IED, digital protection relay, or the like). It should be appreciated that a plurality of IEDs within the electrical power delivery system could be used to transmit, forward, and receive key messages from a plurality of IEDs within the electrical power delivery system. It should also be appreciated that an IED within the power system could function as both a master and monitoring IED.

Additionally, the method 400 may include receiving 430 a station-wide key message, continuously recording digital process bus data on a plurality of IEDs, and generating 435 local event reports via a plurality of IEDs (e.g., special purpose device, Ethernet switch, process bus publishing IED, digital protection relay, or the like) within the electrical power delivery system.

The method 400 may further include retrieving 440 the local event reports from a plurality of IEDs (e.g., special purpose device, Ethernet switch, process bus publishing IED, digital protection relay, or the like) within the electrical power delivery system.

The method 400 may also include merging 445 the local event reports into a station-wide event report via a software module.

Figure 5:
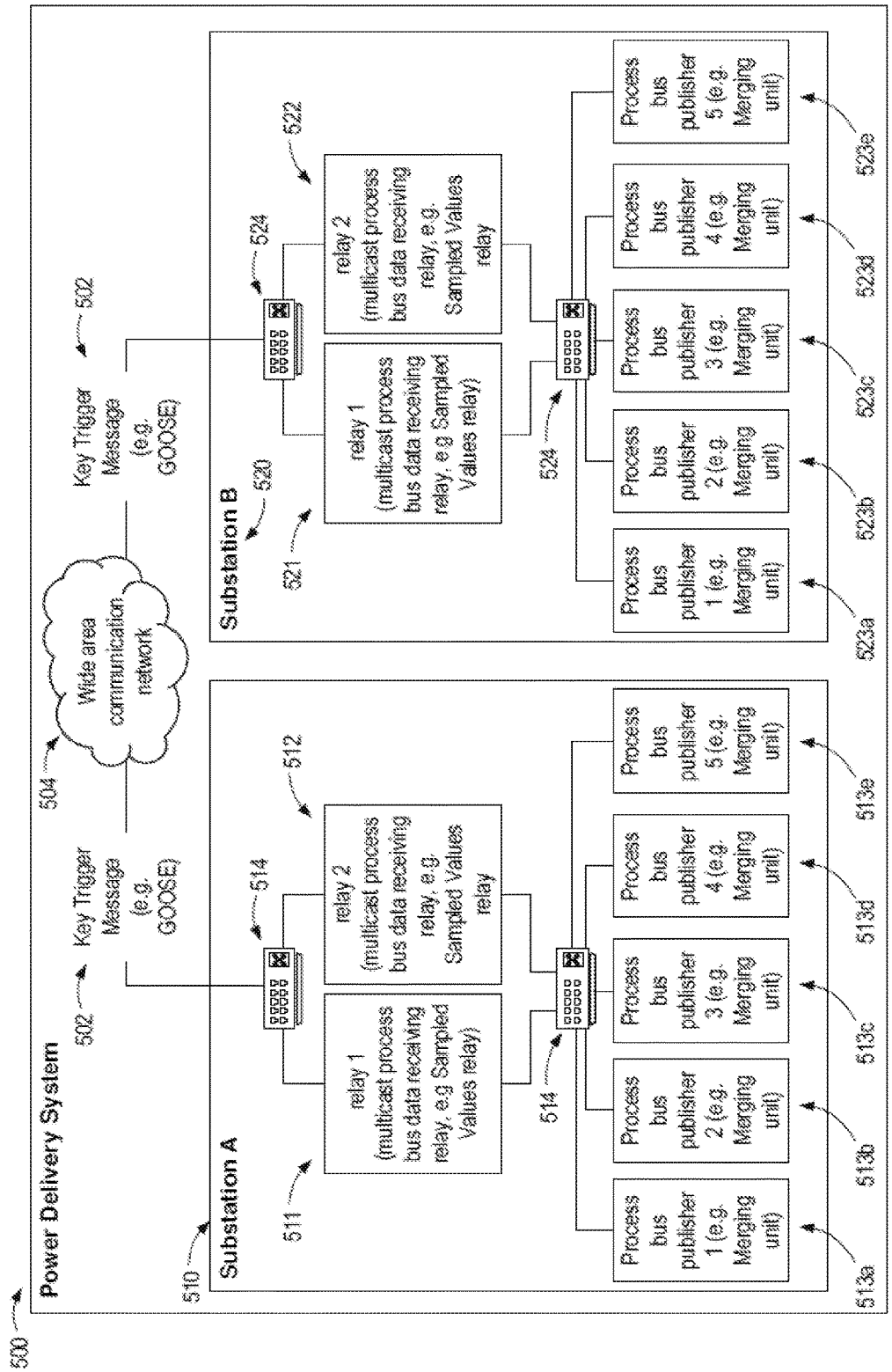
FIG. 5 illustrates an example of a system-wide recording system.

FIG. 5 illustrates multiple substations with the ability to generate a system-wide event report according to one embodiment of the present disclosure. A power delivery system 500 includes a plurality of operably connected substations 510/520 via a long distance transmission line (not shown). The substations 510/520 may include a plurality of process bus publishers 513(a-e)/523(a-e), a plurality of multicast process bus data receiving relays 511,512/521, 522, and a plurality of network communication devices (e.g., a router, switch, or hub) 514/524. Each component within the substations 510/520 may be operably connected to other components within the power delivery system 500. When the process bus publisher 1 513*a* in the substation A 510 experiences a fault, the relay 1 511 may transmit a key message (e.g., GOOSE message) to the relay 2 512. The relay 1 511 may transmit a system-wide key message 502 to the relay 1 521 and the relay 2 522 in the substation B 520 via a wide area communication network 504. The relay 1 511,521 and the relay 2 512,522 within each respective substation may be configured to continuously record digital process bus data. Upon receiving a system-wide key message, the relay 1 511,521 and the relay 2 512,522 within each respective substation may generate a local event report from continuously recorded digital process bus data. A software module may be used to retrieve the local event reports from each relay within the power delivery system 500 and merge them into a system-wide event report.

In some embodiments, the terms system-wide and station-wide are used to imply that all IEDs within the electrical power delivery system generate local event reports upon the occurrence of a fault, or that at least one IED from every distribution line will generate a local event report. However in some embodiments, the terms system-wise and station-wide are used to described a system in which a fault may trigger any combination of IEDs from any combination of distribution lines to generate local event reports. The data used to generate local event reports may be based on continuously recorded digital process bus data, incremental or period recordings, and/or recordings initiated by a trigger associated with the detected fault.

For example, the occurrence of a fault on process bus publisher 1 513*a* within substation A 510 may trigger the generation of a local event report by relay 1 511 and exclude relay 2 512 from local event report generation. Any combination of IEDs within a substation may be triggered to generate a local event report. Likewise, a varying number of IEDs within a varying combination of substations may be triggered to generate a local event report. For example, the occurrence of a fault on a line within substation A 510 may trigger relay 1 521 and relay 2 522 within substation B 520 to generate local event reports while excluding relay 1 511 and relay 2 512 within substation A 510 from local event report generation.

Figure 6:
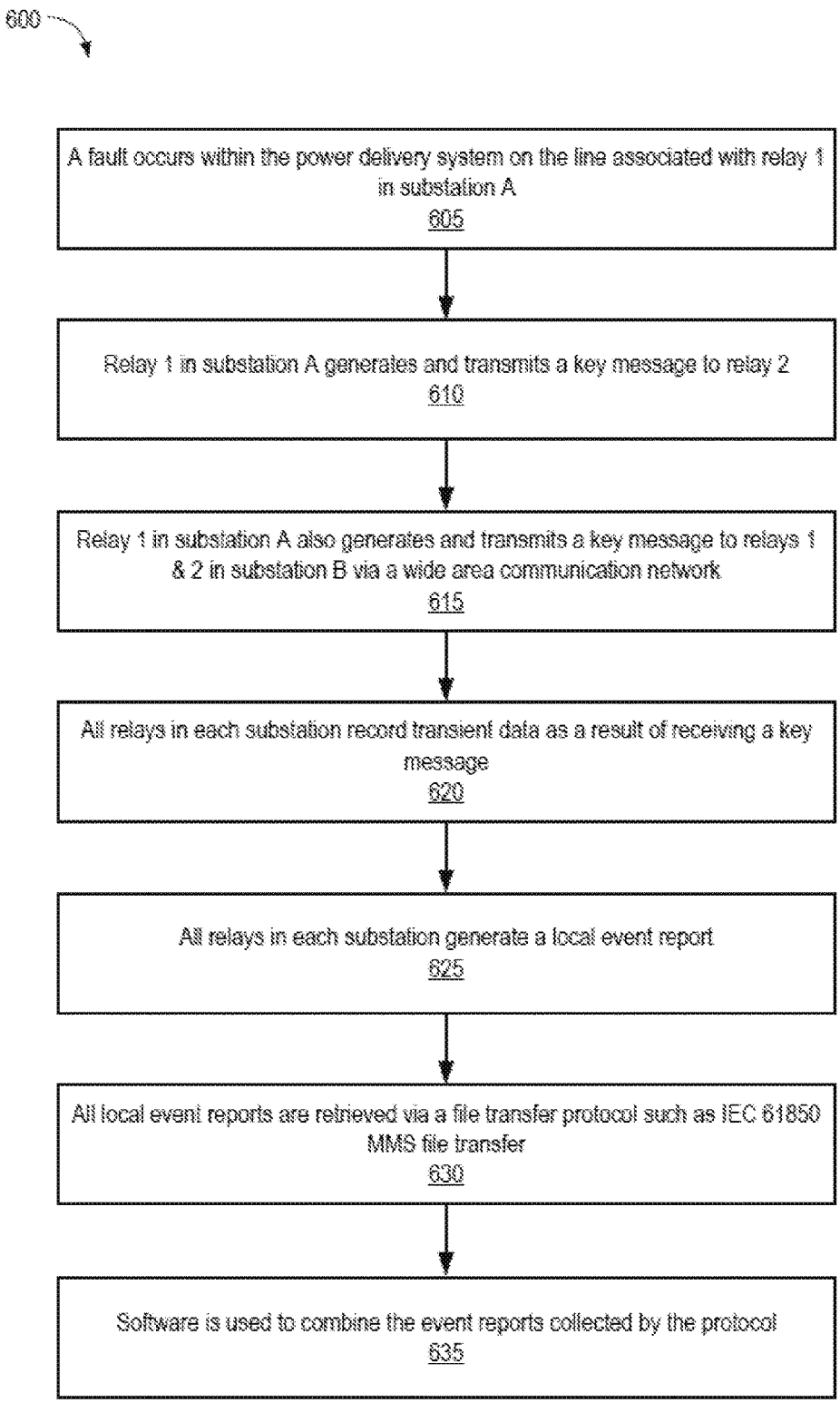
FIG. 6 is a flow chart of one example of a method for generating a system-wide event report.

FIG. 6 is a flow chart of a method 600 for generating a system-wide event report within an electrical power delivery system, according to one embodiment of the present disclosure. The method 600 may include detecting the occurrence 605 of a fault, control from an operator, or any other predetermined condition on a given line within the electrical power delivery system.

The method 600 may further include generating and transmitting 610 a system-wide key message (e.g., GOOSE message) upon the occurrence of the predetermined condition via a monitoring IED (e.g., special purpose device, Ethernet switch, process bus publishing IED, digital protection relay, or the like) within the electrical power delivery system.

The method 600 may also include receiving 615 the system-wide key message via a plurality of IEDs (e.g., special purpose device, Ethernet switch, process bus publishing IED, digital protection relay, or the like) within a plurality of substations comprising the electrical power delivery system and continuously recording 620 digital process bus data within a plurality of substations comprising the electrical power delivery system. It should be appreciated that a plurality of IEDs within the electrical power delivery system could be used to transmit, forward, and receive key messages to/from a plurality of IEDs within various substations of the electrical power delivery system.

Additionally, the method 600 may include generating 625 local event reports from the continuously recorded digital process bus data via a plurality of IEDs (e.g., special purpose device, Ethernet switch, process bus publishing IED, digital protection relay, or the like) within a plurality of substations comprising the electrical power delivery system.

The method 600 may further include retrieving 630 the local event reports from a plurality of IEDs (e.g., special purpose device, Ethernet switch, process bus publishing IED, digital protection relay, or the like) located in various substations within the electrical power delivery system.

The method 600 may also include combining 635 the local event reports via a software module.

Figure 7:
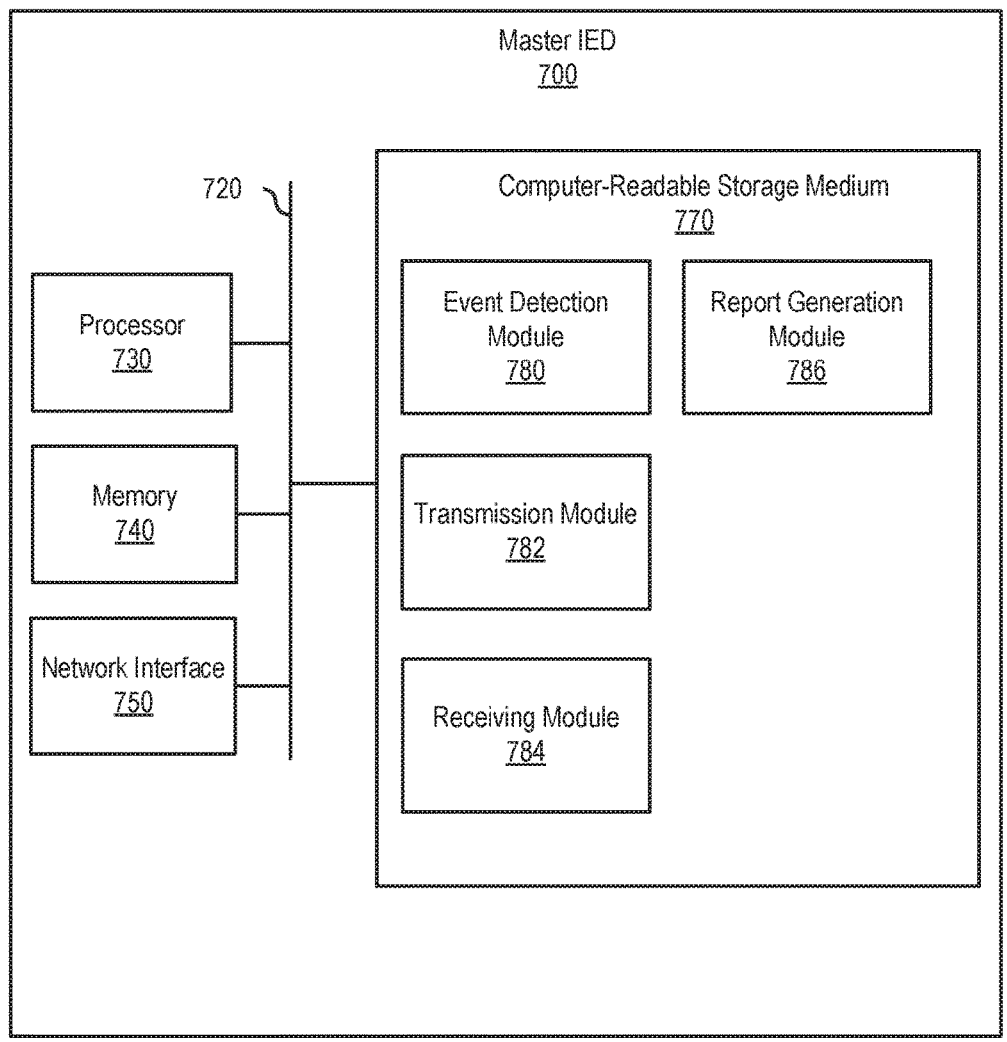
FIG. 7 illustrates an example of an intelligent electronic device, according to one embodiment.

FIG. 7 illustrates an example embodiment of an IED. The IED includes a bus 720 connecting a processor 730 or processing unit(s) to a memory 740, a network interface 750, and a computer-readable storage medium 770. The computer-readable storage medium 770 may include or interface with software, hardware, or firmware modules for implementing various portions of the systems and methods described herein. The separation of the modules is merely an example, and any combination of the modules or further division may be possible.

The computer readable storage medium 770 may include an event detection module 780 configured to detect an occurrence of a predetermined electrical event within a portion of an electrical power delivery system and communicate the occurrence with other IEDs within the electrical power delivery system. The medium 770 may also include a key message transmission module 782 configured to generate and transmit a system-wide key message to a plurality of monitoring IEDs within the electrical power delivery system, wherein each of the plurality of monitoring IEDs is configured to monitor a distinct portion of the electrical power delivery system. The medium 770 may further include a receiving module 784 configured to receive electrical transient data from each of the plurality of monitoring IEDs provided by the monitoring IEDs in response to receiving the system-wide key message. Additionally, the medium 770 may include a report generation module 786 configured to generate a system-wide event report based on the received electrical transient data from at least some of the plurality of monitoring IEDs.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

What is claimed:

1. A system for an electrical power delivery system, comprising:
a communications network configured to communicatively connect a plurality of intelligent electronic devices (IEDs);
a first IED configured to monitor a first portion of an electrical power delivery system, the first IED configured to detect an occurrence of a predetermined electrical event within the monitored first portion of an electrical power delivery system;
a master IED configured to receive a notification from the first IED indicating the detection of the occurrence of the predetermined electrical event, the master IED configured to transmit a system-wide key message via the communications network to at least one monitoring IED based on the notification received from the first IED;
a plurality of monitoring IEDs configured to monitor distinct portions of the electrical power delivery system and transmit electrical transient data to the master IED in response to receiving the system-wide key message; and
a reporting module configured to generate a system-wide event report based on at least some of the electrical transient data transmitted to the master IED by the plurality of monitoring IEDs.

2. The system of claim 1, wherein the reporting module is configured to generate a report in the COMTRADE file format.

3. The system of claim 1, wherein the electrical transient data transmitted is in the COMTRADE file format.

4. The system of claim 1, wherein the reports are based on continuously recorded digital bus data.

5. The system of claim 1, wherein the IED is a special-purpose device, process bus publishing IED, digital protection relay, or Ethernet switch.

6. The system of claim 1, wherein the key messages are generic object oriented substation events (GOOSE) messages or a related transfer mechanism.

7. The system of claim 1, wherein the master IED is also a monitoring IED.

8. The system of claim 1, wherein the software module that merges the local reports is contained within and initiated by an IED within the electrical power generation system.

9. The system of claim 1, wherein the software module that merges the local reports is initiated by an operator of the electrical power generation system.

10. The system of claim 1, wherein the generated report is simultaneously generated with a network capture data file.

11. The system of claim 1, wherein a key message is generated in response to the occurrence of a predetermined condition.

12. The system of claim 11, wherein the predetermined condition is a fault within the electrical power delivery system.

13. The system of claim 11, wherein the predetermined condition is a control from an operator of the electrical power delivery system.

14. A computer-readable medium comprising instructions that, when executed by a processor of an intelligent electronic device (IED), cause the IED to perform operations for generating a system-wide event report in response to a detected electrical event within a portion an electrical power delivery system, the operations comprising:
detecting an occurrence of a predetermined electrical event within a portion of an electrical power delivery system monitored by a first IED;
communicating the detection of the predetermined electrical event to a master IED;
transmitting a system-wide key message to a plurality of monitoring IEDs within the electrical power delivery system, wherein each of the plurality of monitoring IEDs is configured to monitor a distinct portion of the electrical power delivery system;
receiving electrical transient data from each of the plurality of monitoring IEDs provided by the monitoring IEDs in response to receiving the system-wide key message; and
generating a system-wide event report based on the received electrical transient data from at least some of the plurality of monitoring IEDs.

15. A method for implementing an electrical control decision based on system-wide electrical event data, comprising:
a first intelligent electronic device (IED) detecting an occurrence of a predetermined electrical event within a portion of an electrical power delivery system monitored by the first IED;
the first IED communicating the detection of the predetermined electrical event to a master IED;
the master IED transmitting a system-wide key message to a plurality of monitoring IEDs within the electrical power delivery system, wherein each of the plurality of monitoring IEDs is configured to monitor a distinct portion of the electrical power delivery system;
each of the plurality of monitoring IEDs receiving the system-wide key message from the master IED;
the plurality of monitoring IEDs collecting electrical transient data from each of the distinct portions of the electrical power delivery system, respectively;
each of the plurality of monitoring IEDs transmitting the electrical transient data to the master IED; and
implementing an electrical configuration decision based on the electrical transient data from at least two of the monitoring IEDs.

16. The method of claim 15, wherein the collected electrical transient data comprises a COMTRADE report.

17. The method of claim 15, wherein collected electrical transient data is based on continuously recorded digital bus data.

18. The method of claim 15, wherein the IED is a special-purpose device, process bus publishing IED, digital protection relay, or Ethernet switch.

19. The method of claim 15, wherein the key messages are generic object oriented substation events (GOOSE) messages or a related transfer mechanism.

20. The method of claim 15, wherein the master IED is also a monitoring IED.

21. The method of claim 14, wherein the generated report is simultaneously generated with a network capture data file.

22. The method of claim 14, wherein the monitoring IED generates a key message in response to the occurrence of a predetermined condition.

23. The method of claim 15, wherein the predetermined condition is a fault within the electrical power delivery system.

24. The method of claim 15, wherein the predetermined condition is a control from an operator of the electrical power delivery system.

\* \* \* \* \*